July 27, 1965  B. N. HOFFSTROM  3,196,674
DYNAMOMETERS

Filed Sept. 15, 1961  2 Sheets-Sheet 1

INVENTOR
Bo N. Hoffstrom

BY
ATTORNEYS

July 27, 1965 B. N. HOFFSTROM 3,196,674
DYNAMOMETERS
Filed Sept. 15, 1961 2 Sheets-Sheet 2

INVENTOR
Bo N. Hoffstrom
ATTORNEYS

United States Patent Office 3,196,674
Patented July 27, 1965

3,196,674
DYNAMOMETERS
Bo N. Hoffstrom, Santa Monica, Calif., assignor to Douglas Aircraft Company, Inc., Santa Monica, Calif.
Filed Sept. 15, 1961, Ser. No. 150,111
4 Claims. (Cl. 73—134)

This invention relates to dynamometers and more particularly to improved high speed dynamometers which utilize air as the working medium.

It is a principal purpose and object of the present invention to provide dynamometers of novel construction which are completely self-contained and which do not require separate or auxilary equipment usually associated with such units.

It is a further object of the present invention to provide improved dynamometers which are compact, rugged and are capable of operation at very high speeds, i.e. 30,000 to 90,000 r.p.m. without loss of accuracy or undue wear.

It is also an object of the present invention to provide improved dynamometers which may be readily adapted for use with apparatus rotating in either a clockwise direction or a counterclockwise direction and the capacity of which is readily adjustable to permit the adaptation of the unit to suit specific applications with a minimum of lost time.

It is a further object of the present invention to provide improved dynamometers in which the heat developed within the unit in operation is automatically rejected.

In attaining these and other objects, the present invention provides a dynamometer which has a housing carrying an input shaft attachable to the mechanism to be tested. The input shaft carries a number of rotor vanes which rotate in a chamber which also contains a plurality of stator vanes. The rotation of the rotor vanes induces a flow of air in the region of the stator vanes producing a transfer of rotary force from the rotor to the stator vanes and to other portions of the housing carrying the stator vanes which tends to rotate the latter, with respect to a fixed housing portion. This rotation is resisted by a spring system which permits limited rotation of the housing portion associated with the stator vanes until the torque developed is balanced by the spring torque. Since the developed torque is a direct function of the applied torque, the angular displacement of the housing components, which is indicated on a direct reading external scale, thus indicates the applied torque. Provision is also made for locking the rotor vanes to the stator vanes to provide a direct measurement of stall torque.

Additional objects and advantages of the present invention will become apparent as the description proceeds in connection with the accompanying drawings in which.

Figure 1:
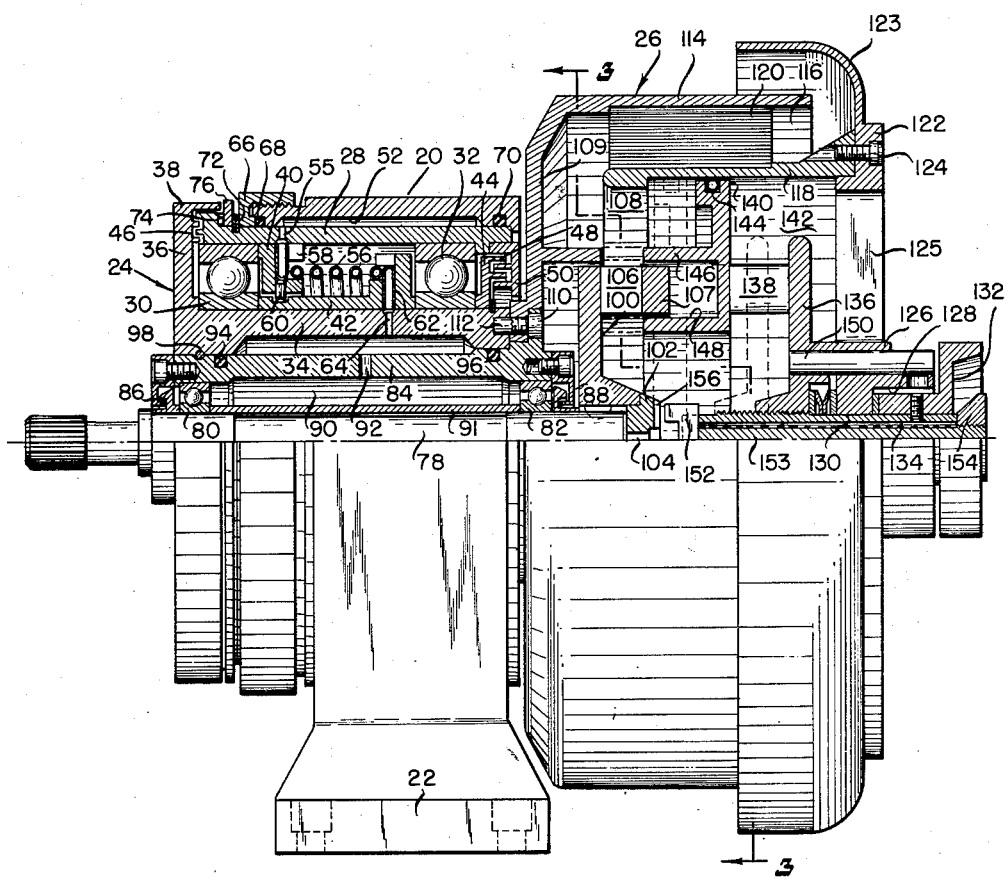
FIGURE 1 is a central vertical half-section of a dynamometer constructed in accordance with the present invention.
Figure 2:
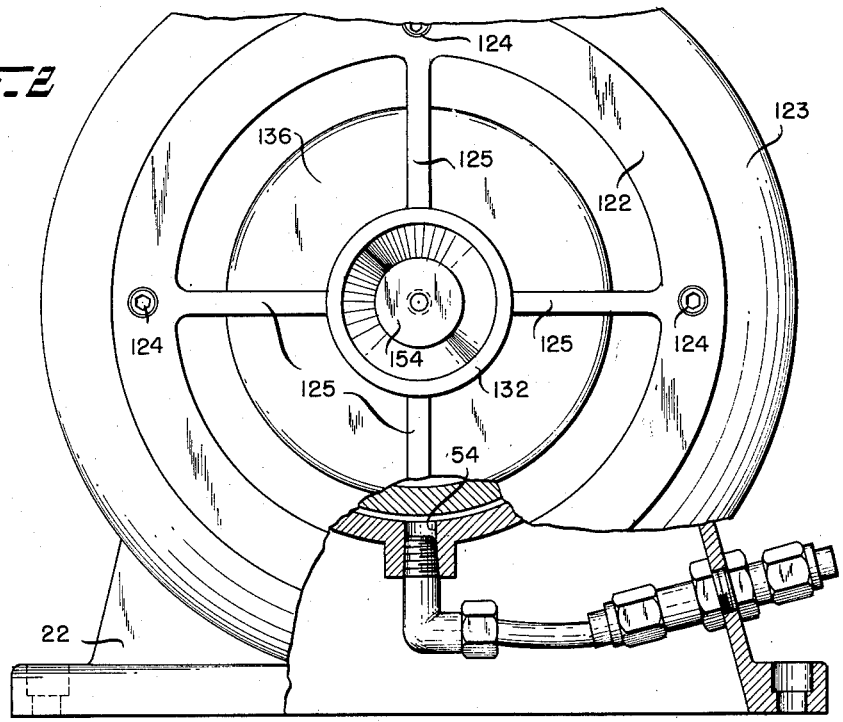
FIGURE 2 is an end view of the apparatus of FIGURE 1.
Figure 3:
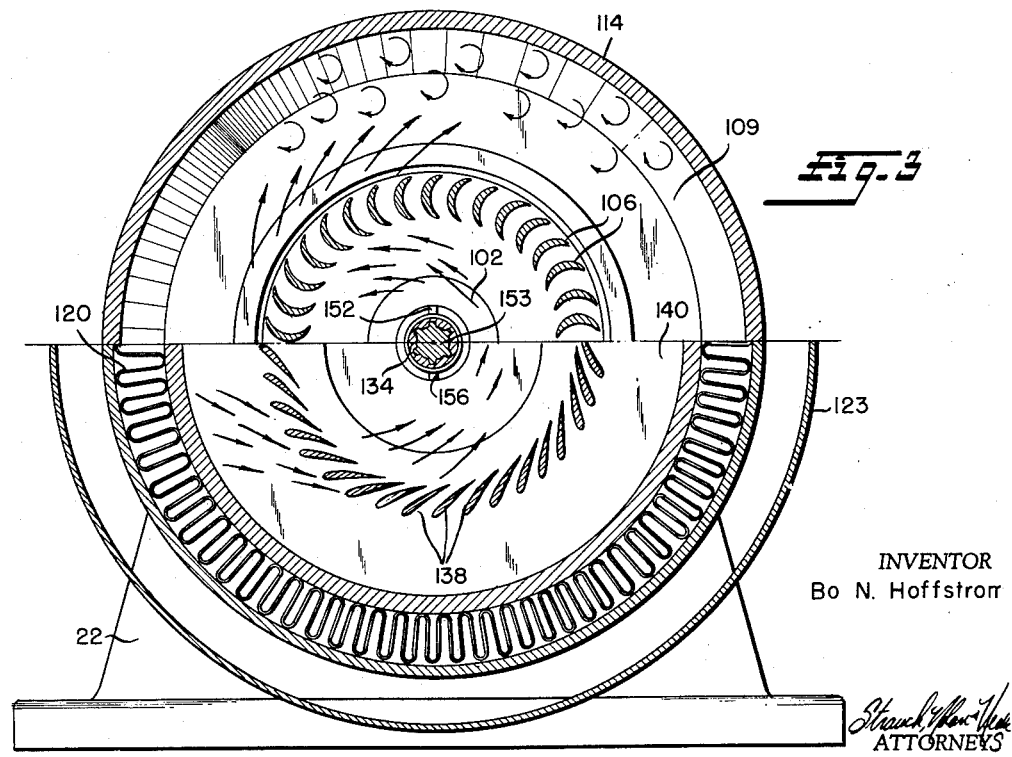
FIGURE 3 is a transverse vertical section taken along line 3—3 of FIGURE 1.

The dynamometer of the present invention is carried by a base member having a cylindrical section 20 and a flat base section 22 for attachment to any suitable support surface, not shown. The remainder of the unit comprises two major sub-assemblies, the torque scale sub-assembly, indicated generally at 24 and the air brake assembly at 26, each of which is detachably carried by the base section 20.

The torque scale sub-assembly includes a cylindrical member 28 received with a sliding fit in the bore of the cylindrical portion 20 of the base. Mounted within the bore of the cylindrical member 28 are a pair of precision low torque ball bearing assemblies 30 and 32, the inner races of which support an inner collar member 34. The collar 34 is provided with an end wall portion 36 having at its outer periphery an inturned cylindrical flange 38, the outer surface of which is suitably numerically inscribed to provide a torque scale. The bearing assemblies 30 and 32 are suitably positioned by shoulders and the respective collars 28 and 34 and spacers 40, 42 and 44. The spacer 40 is cemented to the member 28 while the spacer 42 is cemented to the collar 34. Zero friction labyrinth seals 46 and 48 are provided between members 28 and 36 and between the spacer 44 and an end plate member 50 mounted on the collar 28 to seal the chamber in which the bearings 30 and 32 operate. The inner wall of the base 20 is cut away to provide an annular recess 52 to which a lubricating oil mist is supplied through an opening 54 in the base. The oil mist flows from the chamber 52 through passage 55 into one end of a hollow helical spring 56, the end of the spring being locked against rotation by a projecting flange 58 on the spacer 40. The spacer 40 carries a pin 60 which projects into a slot extending part way around spacer 42 to limit relative rotation of the parts. At its opposite end, the spring 56 is provided with a hook portion 62 which fits within a suitable slot in the spacer member 42, the end of the spring being in communication with a drilled passage 64 leading to the interior of the collar 34.

The torque scale sub-assembly is detachably secured to the base 20 by a lock nut 66 threaded onto the outer periphery of the cylindrical base part 20. A radial flange on the lock nut 66 compresses O-ring 68 to form a tight frictional lock between the parts and the O-ring 68 with O-ring 70 sealing the space 52. Positioned between a snap ring 72 and spring washer 74 is an indicator ring 76 which is provided on its outer periphery with an index mark to cooperate with the torque scale 38 to provide convenient means for direct reading of the applied torque.

The input shaft 78, the outer end of which is splined for driving attachment to the apparatus to be tested is supported for rotation coaxially of the cylindrical housing portion 20 on bearings 80 and 82 carried by a sleeve 84 received with a sliding fit in the bore of the torque scale assembly 24. End plates 86 and 88 are attached to the opposite ends of the sleeve 84 to position the bearing assembly and to provide labyrinth seals at the opposite ends of the annular space 90 within the collar 84. Spacer 91 positions the inner races of the bearings. Oil mist is applied to the space 90 through one or more drilled ports 92, the lubricant chamber at the outer surface of the sleeve 84 being sealed by O-rings 94 and 96. The sleeve 84 is held against axial movement within the torque scale sub-assembly by a snap lock ring 98.

A rotor member 100 is keyed to the inner end of the shaft 78 and is held in place by a cap member 102 secured to the end of the shaft by a screw 104. The motor member carries a plurality of C-shaped rotor vanes 106, the outer ends of which are joined by a ring 107. The rotor vanes 106 rotates in a chamber 108 formed in part by a housing member 109 secured as by screws 110 to the sleeve 84. The housing member 109 carries one or more pins 112 which project into the sleeve 34 to lock the parts against relative rotation.

An axially projecting cylindrical flange 114 preferably formed integrally with he housing member 109 forms an annular exhaust passage 116 with a ring member 118, the member 118 being secured to the flange 114 by a sinuous strip 120. An end plate 122, which carries a reversely turned air guide lip 123, is secured to ring member 118 by screws 124. The outer rim of ring 122 is joined by a plurality of flat spokes 125 to a central hub 126 provided with stepped bores 128 and 130 in which a control knob 132 and a control shaft 134, respectively, are journalled. Threaded onto the inner end of the control shaft 134 is a stator assembly comprising radially extending plate 136 which carries a plurality of circumferentially spaced stator vanes 138, the opposite ends of which are joined to an annular wall assembly 140 which separates the chamber 108 from an inlet chamber 142. The outer cylindrical surface of the wall assembly 140 is received with a sliding fit within a ring 118, an O-ring 144 being provided to seal the parts at this point. The wall member 140 is also provided with cylindrical flanges 146 and 148 adapted to extend over the ring 107. The entire stator assembly is adapted to be shifted to the dotted line throttling position upon rotation of the control knob 132. A plurality of pins 150 carried by the wall member 136 project into openings in the hub 126 to prevent rotation of the stator assembly and to guide it during the adjusting movement. The outer surface of the control knob 132 may be provided with suitable indicia to indicate the adjusted position of the stator assembly.

As explained below, the apparatus is also effective to measure stalled torque. For this purpose the rotor may be selectively locked to the stator by a flat key 152 which has a splined body 153 slidably received in a splined bore in the shaft 134. A retaining nut 154 is threaded onto the outer end of the key 152 to hold the inner enlarged end of the key in a slot in the inner end of the shaft 134 and out of contact with a transverse slot 156 in the cap member 102. When the nut 154 is backed off and the entire assembly is pushed in, the key engages the cap member 102 to provide a positive mechanical lock between the rotor and stator.

The unit may be readied for operation by attaching the splined end of the input shaft 78 to the apparatus to be tested. The indicator ring 76 is displaced if necessary to provide a zero initial reading and the throttle is set by an adjustment of knob 132 to provide the desired torque load. In the apparatus of the present invention the load is the torque required to drive the rotor. When the rotor is driven, the rotor blades 106 create an air flow through the brake. Air from the surrounding atmosphere is drawn in through the passages between the spokes 125 of the end plate 122 and over the stator vanes 138 which set up a vortex flow rotating in a direction opposite from the direction of rotation of one rotor. During its passage through the rotor blades the air receives an impulse. Since the change of air velocity through the rotor is directly proportional to rotor r.p.m. and the mass flow is also directly proportional to rotor r.p.m. and to the degree of the opening provided by the setting of the throttle, the impulse-momentum equation for constant flow ($F=Mdv$) can be written:

Force=(constant)×(rotor opening)×(r.p.m.)$^2$

The loading torque, which is equal to force multiplied by the rotor radius, thus is proportional to the rotor opening. Since the rotor opening can be regulated by proper adjustment of the control knob 132, the loading torque can be varied over a wide range.

According to the law of action and reaction, the loading torque acting on the rotor assembly produces an equal opposite reaction torque on the brake housing which is transmitted to the spring 56. This reaction can be obtained, however, only if the air leaves the brake without rotational energy. The narrow slots extending axially of the unit, provided by the sinuous strip 120, establish a laminar exhaust flow with no rotational component. Since the reaction torque, which is equal to the loading torque plus the friction torque from the rotor bearings 80 and 82 is transmitted to the housing, the measured torque is equal to the input torque.

The high kinetic energy of the air leaving the rotor is converted into heat by turbulence in the chamber between the rotor and the outlet section, the chamber 108 being shaped to promote this turbulence. Air is discharged away from the inlet by the curved shroud member 123 to preclude recirculation of the hot exhaust to the inlet to cause high operating temperatures.

When the key 152 is moved into locking position, the stall torque applied to the input shaft is directly readable on the torque scale.

If it is desired to use the dynamometer for testing apparatus rotating in the opposite direction, the entire brake sub-assembly 26 is removed by withdrawing it axially to the right as viewed in FIGURE 1 overcoming the limited resistance of the snap ring 98. The unit is then replaced by a unit which is identical except that the vanes 106 and 138 are inclined in the opposite direction.

The dynamometer of the present invention is characterized by extreme accuracy and sensitivity and the inaccuracy normally introduced by frictional effects particularly at very high speeds has been eliminated. Further, the lubrication system is such that the oil mist is transmitted to the bearings without friction or reaction which could otherwise disturb the accuracy of the torque reading.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Torque absorbing and measuring apparatus comprising a fixed housing, a brake housing rotatably carried by said fixed housing, said brake housing having an annular working chamber, an annular divider in said working chamber providing first and second radial passages connected at their inner ends, said brake housing having an axially extending inlet passage connected to the outer end of said first radial passage and an axially extending outlet passage connected to the outer end of said second radial passage, a plurality of stator vanes rigid with said brake housing and positioned in said first radial passage, said stator vanes being inclined to rotate air passing inwardly over them in a predetermined direction, a torque receiving shaft rotatably carried by said brake housing, a plurality of pump vanes carried by said shaft and positioned in said second radial passage and adapted to rotate air in said second radial passage in a direction opposite to said predetermined direction, the rotation of said shaft and said pump vanes causing air to flow from said inlet passage to said outlet passage successively over said stator vanes to rotate said air in said predetermined direction to develop a force tending to rotate said brake housing, and the direction of rotation of said air being reversed by said pump vanes, and means in said outlet passage for causing said rotating air to flow axially of said brake housing to develop a further force tending to rotate said brake housing, and means connected to said fixed housing and to said brake housing to yieldably oppose rotation of said brake housing, and throttle means for varying the size of one of said radial passages to thereby vary the force tending to rotate said brake housing.

2. Torque absorbing and measuring apparatus comprising a fixed housing, a brake housing rotatably carried by said fixed housing, said brake housing having an annular working chamber, an annular divider in said working chamber providing first and second radial passages interconnected at one end, said brake housing having an axially extending inlet passage connected to said first radial passage and an axially extending outlet passage connected to said second radial passage, a plurality of stator vanes rigid with said brake housing positioned in said first radial passage, said stator vanes being inclined to rotate air passing inwardly over them in a predetermined direction, a torque receiving shaft rotatably carried by said brake housing, a plurality of pump vanes carried by said shaft and positioned in said second radial passage and adapted to rotate air in said second radial passage in a direction opposite to said predetermined direction, the rotation of said shaft and said pump vanes causing air to flow from said inlet passage to said outlet passage over said stator vanes to rotate said air in said predetermined direction to develop a force tending to rotate said brake housing, and the direction of rotation of said air being reversed by said pump vanes, means in said outlet passage for causing said reversely rotating air to flow axially of said brake housing to develop a further force tending to rotate said brake housing and means yieldably opposing rotation of said brake housing with respect to said fixed housing.

3. The apparatus according to claim 2 together with throttle means adapted to adjustably extend across one of said radial passages for adjustably restricting the flow of air through said brake housing.

4. The apparatus according to claim 2 wherein said stator vanes are positioned intermediate the ends of said radial first passage together with a throttle assembly comprising spaced annular members adapted to adjustably extend across said first radial passage inwardly and outwardly of said stator vanes.

References Cited by the Examiner
UNITED STATES PATENTS

| | | | |
|---|---|---|---|
| 2,014,684 | 9/35 | Junkers | 73—134 |
| 2,642,740 | 6/53 | Stephenson et al. | 73—134 |
| 3,007,336 | 11/61 | Livermont | 73—134 |

RICHARD C. QUEISSER, *Primary Examiner.*

ROBERT L. EVANS, *Examiner.*